(12) United States Patent
Pereyra et al.

(10) Patent No.: US 10,681,783 B2
(45) Date of Patent: *Jun. 9, 2020

(54) LUMINAIRE WITH PROGRAMMABLE LIGHT DISTRIBUTION

(71) Applicant: Osram Sylvania Inc., Wilmington, MA (US)

(72) Inventors: Rodrigo Pereyra, Salem, MA (US); Michael Quilici, Essex, MA (US); Seung Cheol Ryu, Marblehead, MA (US); Alan Sarkisian, Marblehead, MA (US)

(73) Assignee: OSRAM SYLVANIA Inc., Wilmington, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/511,078

(22) Filed: Jul. 15, 2019

(65) Prior Publication Data

US 2019/0342964 A1 Nov. 7, 2019

Related U.S. Application Data

(63) Continuation of application No. 15/447,199, filed on Mar. 2, 2017.

(51) Int. Cl.
*H05B 45/10* (2020.01)
*G05B 19/042* (2006.01)
*H05B 47/19* (2020.01)

(52) U.S. Cl.
CPC ......... *H05B 45/10* (2020.01); *G05B 19/0426* (2013.01); *H05B 47/19* (2020.01); *G05B 2219/23069* (2013.01)

(58) Field of Classification Search
None
See application file for complete search history.

(56) References Cited

U.S. PATENT DOCUMENTS

2010/0309016 A1* 12/2010 Wendt ................. H05B 37/029
340/12.51
2014/0297227 A1* 10/2014 Barnard .................... G01J 1/42
702/189

\* cited by examiner

*Primary Examiner* — Dedei K Hammond
(74) *Attorney, Agent, or Firm* — Yutian Ling

(57) ABSTRACT

A method of setting luminance levels of a solid-state light sources of a luminaire with programmable light distribution is provided. The method includes obtaining a file describing a desired light beam distribution, converting the desired light beam distribution into luminance levels for the solid-state light sources, and applying the luminance levels to the solid-state light sources to cause the luminaire to output the desired light beam distribution.

19 Claims, 10 Drawing Sheets

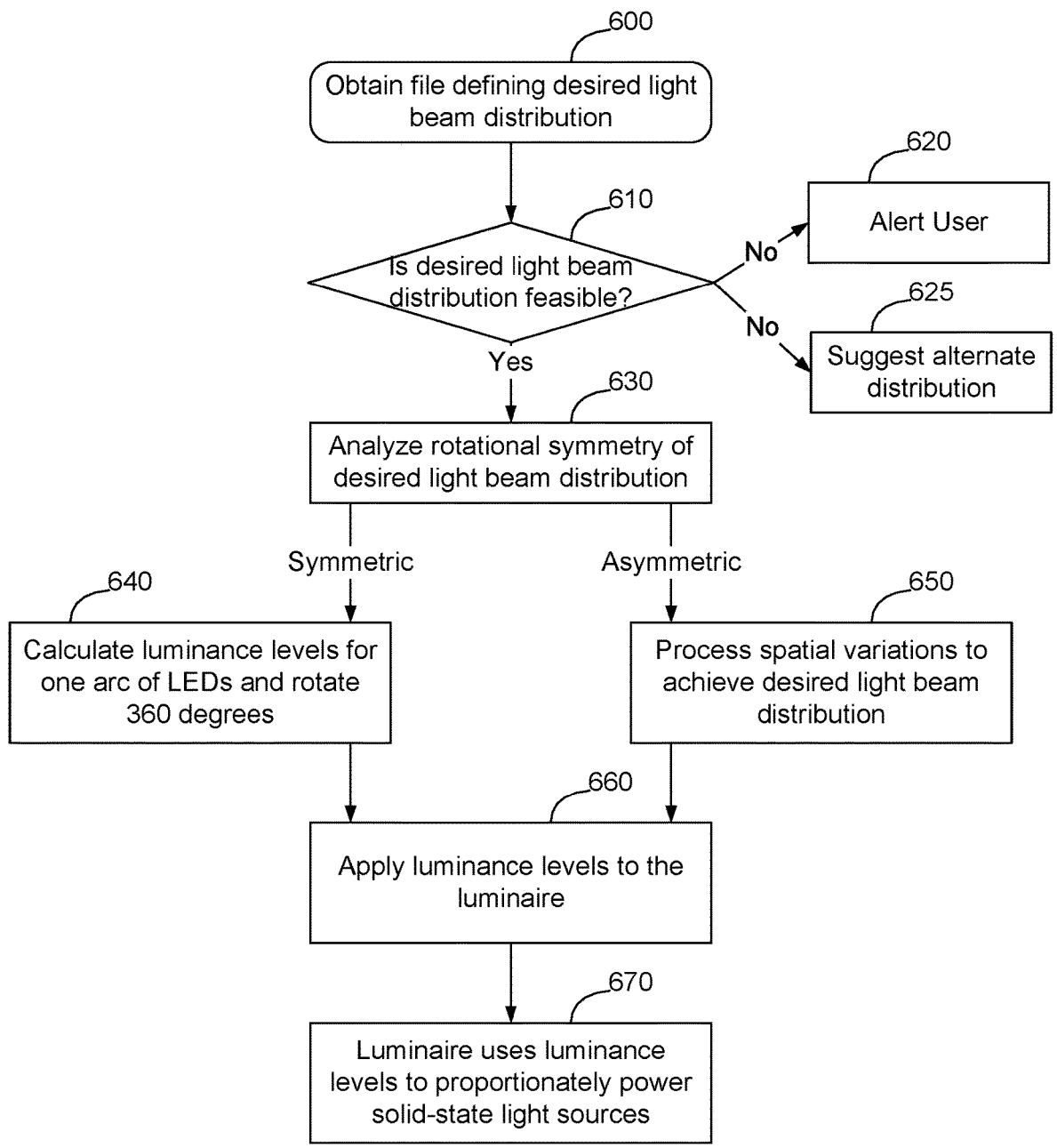

LUMINAIRE WITH PROGRAMMABLE LIGHT DISTRIBUTION

CROSS-REFERENCE TO RELATED APPLICATIONS

This patent application is a continuation of U.S. patent application Ser. No. 15/447,199, entitled "Luminaire with Programmable Light Distribution," filed Mar. 2, 2017, which is hereby incorporated by reference in its entirety.

TECHNICAL FIELD

This present application relates to solid-state lighting fixtures and more particularly to light-emitting diode (LED) based luminaires.

BACKGROUND

Programmable luminaires, such as those utilizing multiple solid-state light sources, allow a user to manually program luminance levels of individual solid-state light sources and groups of solid-state light sources to adjust the direction and intensity of light. However, in cases which multiple such luminaires are to be programmed, manually programming the luminaires may be relatively time-consuming.

SUMMARY

All examples and features mentioned below may be combined in any technically possible way.

Various implementations described herein include a method of setting luminance levels of solid-state light sources of a luminaire with programmable light distribution. The method may include obtaining a file describing a desired light beam distribution, converting the desired light beam distribution into luminance levels for the solid-state light sources, and applying the luminance levels to the solid-state light sources to cause the luminaire to output the desired light beam distribution.

In some implementations, obtaining the file describing the desired light beam distribution may include obtaining an IES file or a EULUMDAT file describing the desired light beam distribution. In some implementations, the IES file or the EULUMDAT file may be obtained from another luminaire with programmable light distribution. In some implementations, the IES file or the EULUMDAT file may be obtained from a database of IES files or EULUMDAT files. In some implementations, the method may further include obtaining an output of a lighting design program, wherein the output including the file, and identifying the luminaire from the output of the lighting design program.

In some implementations, the method may further include performing a feasibility check to determine if the desired light beam distribution is feasible to implement on the solid-state light sources of the luminaire. In some implementations, the feasibility check may be intensity independent. In such implementations, performing the feasibility check may include normalizing data of the file describing the desired light beam distribution to a maximum intensity of the distribution, and using geometric aspects of the desired light beam distribution to determine if the desired light beam distribution is feasible to implement on the solid-state light sources of the luminaire. In such implementations, converting the desired light beam distribution into the luminance levels for the solid-state light sources may include modulating an intensity of the solid-state light sources to emulate the geometric aspects of the desired light beam distribution. In some implementations, the feasibility check may be intensity dependent. In such implementations, performing the feasibility check may include obtaining a calibration file for the luminaire with all solid-state light sources at full intensity and comparing the calibration file to a maximum intensity of the desired light beam distribution.

In some implementations, converting the desired light beam distribution into the luminance levels for the solid-state light sources may include determining whether the desired light beam distribution is rotationally symmetric. In some implementations, in response to determining that the desired light beam distribution is rotationally symmetric, converting the desired light beam distribution into the luminance levels for the solid-state light sources may include calculating luminance levels for one arc of the solid-state light sources and applying the calculated luminance levels to other arcs of the solid-state light sources. In some implementations, in response to determining that the desired light beam distribution is not rotationally symmetric, converting the desired light beam distribution into the luminance levels for the solid-state light sources may include processing spatial variations to achieve the desired light beam distribution.

In some implementations, converting the desired light beam distribution into the luminance levels for the solid-state light sources may include obtaining a light beam configuration profile file specifying individual contributions of the solid-state light sources, and determining intensity constants to be applied to the solid-state light sources from the light beam configuration profile file. In some implementations, the file may include a surface plot of luminance levels at a target surface.

Further implementations described herein include a non-transitory tangible computer readable storage medium having stored thereon a computer program for implementing a method of setting luminance levels of solid-state light sources of a luminaire with programmable light distribution, the computer program including instructions which, when executed by a computer, cause the computer to perform a process including obtaining a file describing a desired light beam distribution, converting the desired light beam distribution into luminance levels for the solid-state light sources, and applying the luminance levels to the solid-state light sources to cause the luminaire to output the desired light beam distribution.

In some implementations, the instructions which, when executed by the computer, cause the computer to perform the process further including implementing a user interface through which a user of the computer interacts with the computer program, the user interface enabling the user to select the file describing the desired light beam distribution from a set of files describing previously defined light beam distributions.

Further implementations described herein include a lighting system. The lighting system includes one or more luminaires, in which a first luminaire in the one or more luminaries includes a plurality of solid-state light sources, and a computer communicatively coupled to the one or more luminaires, the computer including a processor that is configured to obtain a file describing a desired light beam distribution, convert the desired light beam distribution into luminance levels for the plurality of solid-state light sources of the first luminaire, and apply the luminance levels to the plurality of solid-state light sources to cause the first luminaire to output the desired light beam distribution.

In some implementations, the processor may be further configured to receive a user input to change the luminance levels for one or more of the plurality of solid state light sources of the first luminaire, and apply the changed luminance levels to the one or more solid-state light sources of the first luminaire.

BRIEF DESCRIPTION OF THE DRAWINGS

FIG. 6 is a flow chart of an example process of programming a luminaire with programmable light distribution configured in accordance with some embodiments of the present disclosure.

Figure 1:
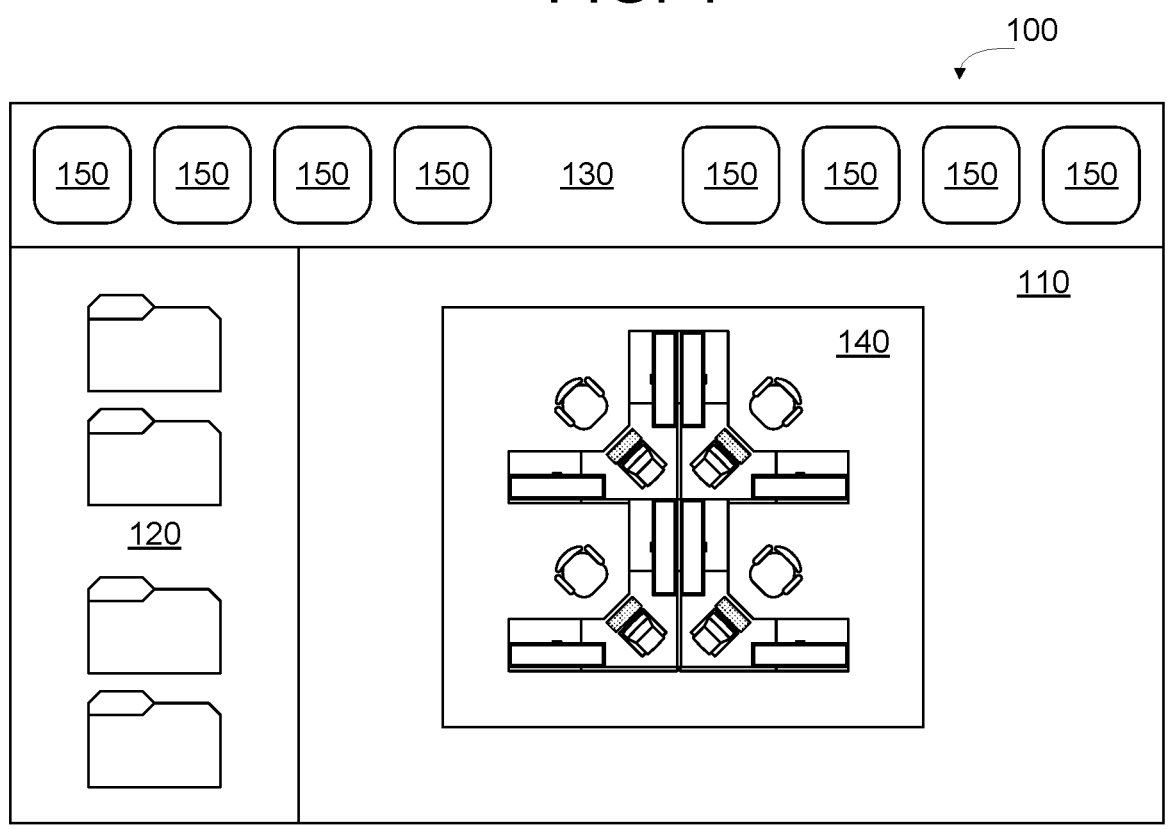
FIG. 1 is a screen view of an example user interface of a lighting design program.

These and other features of the present embodiments will be understood better by reading the following detailed description, taken together with the figures herein described. The accompanying drawings are not intended to be drawn to scale. In the drawings, each identical or nearly identical component that is illustrated in various figures may be represented by a like numeral. For purposes of clarity, not every component may be labeled in every drawing.

DETAILED DESCRIPTION

This disclosure is based, at least in part, on the realization that it would be advantageous to provide a method of setting luminance levels of a solid-state light sources of a luminaire with programmable light distribution.

In some embodiments, a method of setting luminance levels of a solid-state light sources of a luminaire with programmable light distribution is provided. The method includes obtaining a file describing a desired light beam distribution, converting the desired light beam distribution into luminance levels for the solid-state light sources, and applying the luminance levels to the solid-state light sources to cause the luminaire to output the desired light beam distribution. According to an implementation, a light specification file that specifies a lighting profile, such as a file output by a lighting design program, is uploaded to a luminaire control application to enable the luminaire control application to cause the programmable luminaire to automatically set intensity levels of a plurality of solid-state light sources to achieve the lighting profile within the room.

Numerous configurations and variations will be apparent in light of this disclosure.

General Overview

Lighting design involves specifying multiple levels of lighting. For example, multiple layers of lighting may be specified, including ambient, task, focal, and decorative lighting levels. The ambient lighting layer is characterized by uniform lighting conditions. It establishes mood and its principal function is to provide general illumination. The task lighting layer involves additional lighting, usually having a specific light distribution, which enables light to be provided in a specific area where a task or particular function is performed. The focal or accent lighting layer involves specifying lighting that is meant to create contrast and have dramatic effects. For example, focal lighting may be used to illuminate paintings or statues in a museum in a low ambient light situation. The decorative layer is a layer of lighting which is whimsical and creates sparkle. This is typically achieved through the use of decorative luminaires.

FIG. 1 shows an example user interface 100 of an example lighting design program. Lighting designers use computer simulation programs to simulate lighting in a room, building, or other environment. Lighting design programs are commercially available, such as from DIALux and Relux. The example user interface of FIG. 1 does not reflect one of the commercially available lighting design programs, but is an example illustration to provide context for how example lighting design programs operate.

In the example lighting design program user interface shown in FIG. 1, the example user interface 100 includes a model display area 110, a file repository area 120, and a tool ribbon 130. A graphical model 140 of an area for which lighting is to be designed, such as a room or a floor of a building, is selected from the file repository area 120 and loaded into the model area 110. Alternatively the graphical model 140 may be drawn directly in model display area 110 using tools 150 from the tool ribbon 130. The graphical model 140 may be a two dimensional plan view or a three dimensional model. Lighting characteristics are then selected for the graphical model 140 using tools 150 from the tool ribbon 130. For example, the lighting designer may use the user interface 100 of the lighting design program to select and locate particular lighting fixtures relative to the graphical model 140. As the light fixtures are selected and added to the graphical model 140, the light produced by the light fixtures is simulated on the graphical model 140 in the model display area 110. This allows the lighting designer to simulate how the use of particular lighting fixtures affects light within the area for which lighting is to be designed. The output of the lighting design program may be a list of light fixtures and locations where the light fixtures should be installed to enable the particular lighting characteristics to be achieved.

A luminaire is a complete lighting unit, together with all the parts designed to distribute the light, to position the light, and to position and protect the bulbs or solid state lights that produce the light, and to connect the light sources to a power supply. The light output by a luminaire may be characterized by measuring the output light using a photo-goniometer. This measurement quantifies the intensity of the light, in candela (cd) or candela per lumen (cd/lm) as a function of angle. The output of this measurement is typically an Illumination Engineering Society of North America (IES) file or an EULUMDAT file, which is the European equivalent to the IES file specified in IESNA LM-63.

Since different luminaires have different lighting characteristics, e.g. both spectral and beam characteristics, the lighting design program includes IES files of multiple commercially available luminaires to enable the lighting design program to accurately simulate light output by those luminaires. In use, when a lighting designer selects a particular luminaire for use with a particular graphical model, the lighting design program will use the IES file to accurately model the light output from the selected luminaire on the graphical model 140 so that the lighting designer may see the effect of the light on the graphical model 140 of the area for which lighting is to be designed.

As particular luminaires are selected, the lighting design program uses the IES files to depict how light output from particular selected luminaires appears if deployed in the space, so that the lighting designer may determine the effect of deploying the selected luminaires in the modeled area for which lighting is to be designed. The IES file is used by specifiers to model fixtures within a space using the lighting design software, and with that the lighting design professional may determine what luminaires may be used to provide the desired luminance levels and/or conditions. Although there are other considerations that may affect the overall selection of fixtures, such as Correlated Color Temperature (CCT), Color Rendering Index (CRI), and lighting efficiency, beam pattern plays a particularly important role given that it determines fixture spacing and determines illumination patterns within a space.

Once the lighting design has been completed, the lighting design program may output a list of luminaires and their locations so that the selected modeled luminaires may be purchased and installed in the physical space.

Conventional solid-state lighting fixtures often had fixed light beam distributions that were static and determined by their optical construction. As such, these fixtures do not allow a user to adjust the light distribution without physically modifying, moving, or replacing the fixture.

There are instances where the particular lighting selected for a given space may need to change periodically. For example in a retail store, the light characteristics for a given space may change when the manner in which the goods are displayed changes.

Unlike conventional lighting fixtures, a luminaire with an electronically adjustable light beam distribution enables the light output from the luminaire to be adjusted. One example of a luminaire having an electronically adjustable light beam distribution is disclosed in U.S. Pat. No. 9,332,619, entitled "Solid-state luminaire with modular light sources and electronically adjustable light beam distribution," the contents of which are hereby incorporated by reference in its entirety.

Figure 2:
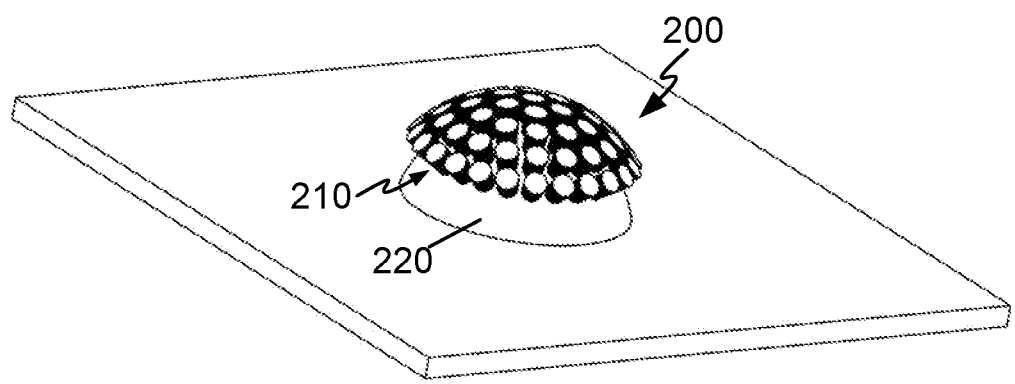
FIG. 2 is a top perspective view of an example luminaire with programmable light distribution.
Figure 3:
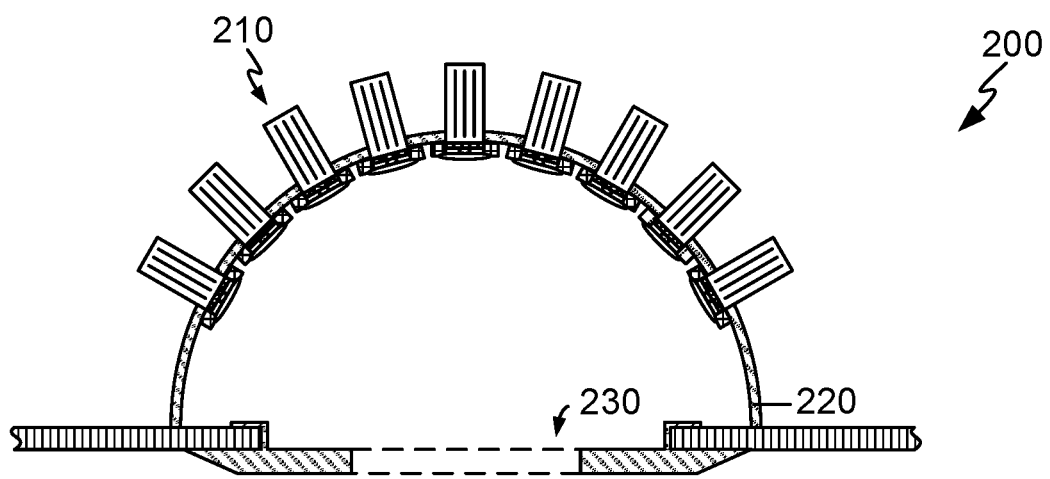
FIGS. 3-4 are cross-sectional views of the example luminaire of FIG. 2.
Figure 4:
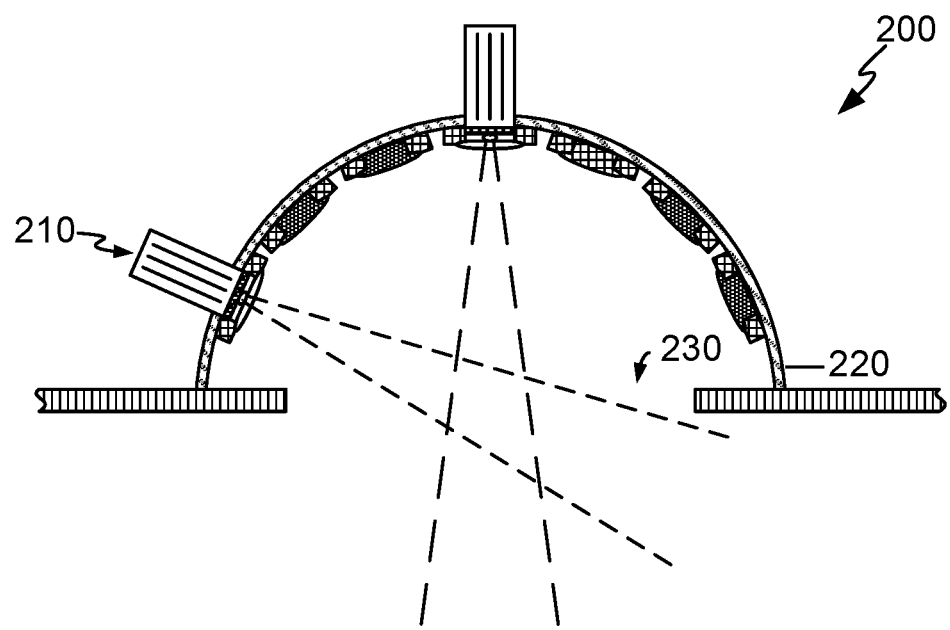

In particular, as shown in FIGS. 2-4, in one implementation a luminaire 200 having an electronically adjustable light beam distribution includes a plurality of solid-state light sources 210 disposed on a housing 220. The housing 220, in one implementation, is hemi-spherical although other housings 220 with other shapes may be used as well.

FIGS. 3 and 4 show cross-sectional views of the example luminaire 200 having an electronically adjustable light beam distribution. As shown in FIG. 3, the plurality of solid-state light sources 210 point toward an aperture 230 to allow light produced by the solid-state light sources 210 to exit the luminaire 200. By selectively individually controlling the intensity of each of the individual solid-state light sources 210, it is possible to electronically adjust the distribution of the light beam output by the luminaire 200. For example, FIG. 4 shows a particular electronically adjustable light beam distribution for the luminaire 200 in which two solid-state light sources 210 are turned on to shine light in particular directions through the aperture 230 while the other solid-state light sources 210 are turned off.

Figure 5A:
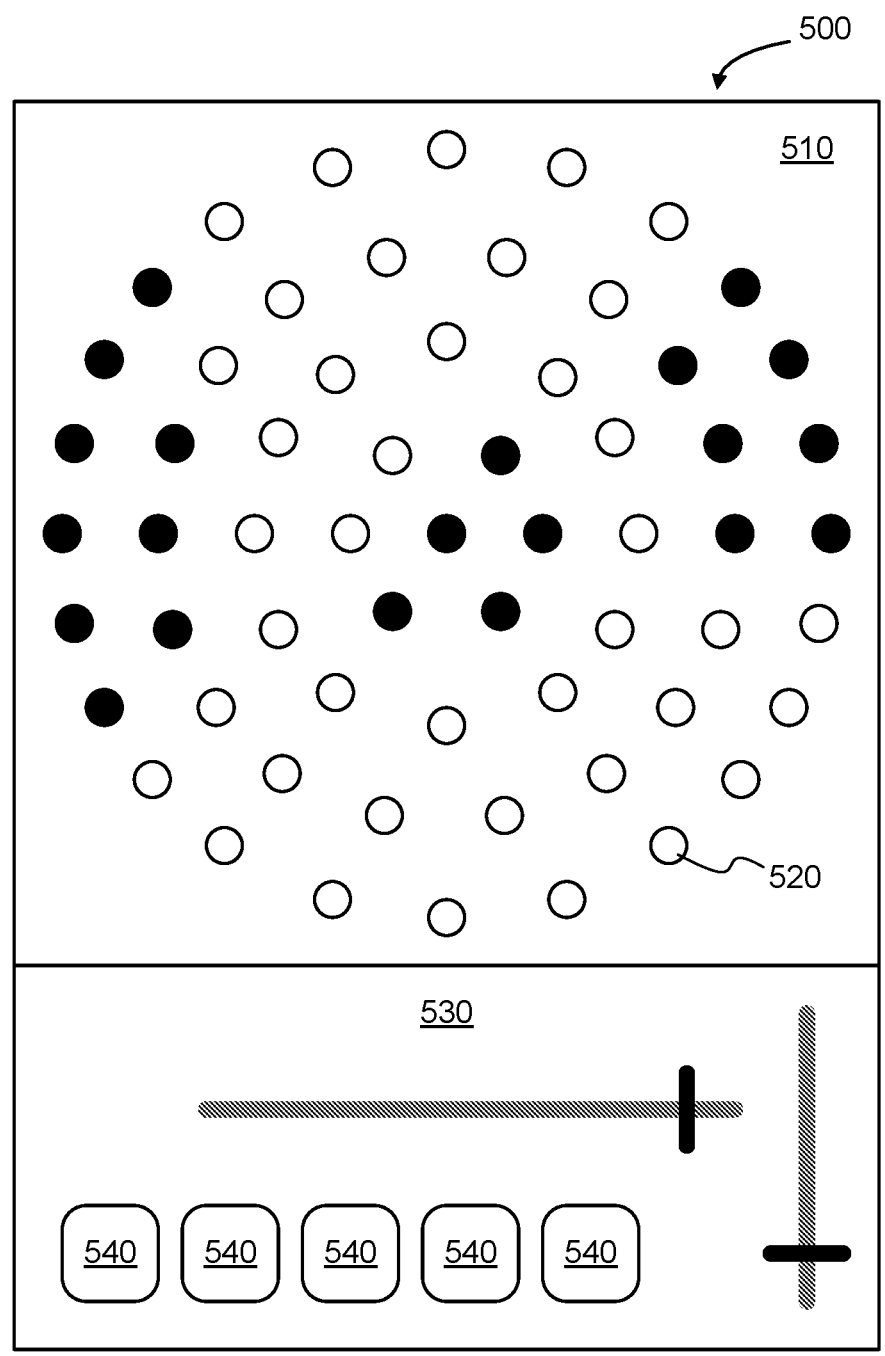
FIGS. 5A, 5B, and 5C are screen views of an example user interface of a luminaire control program to control the programmable light distribution output from an example luminaire such as the luminaire of FIG. 2.
Figure 5B:
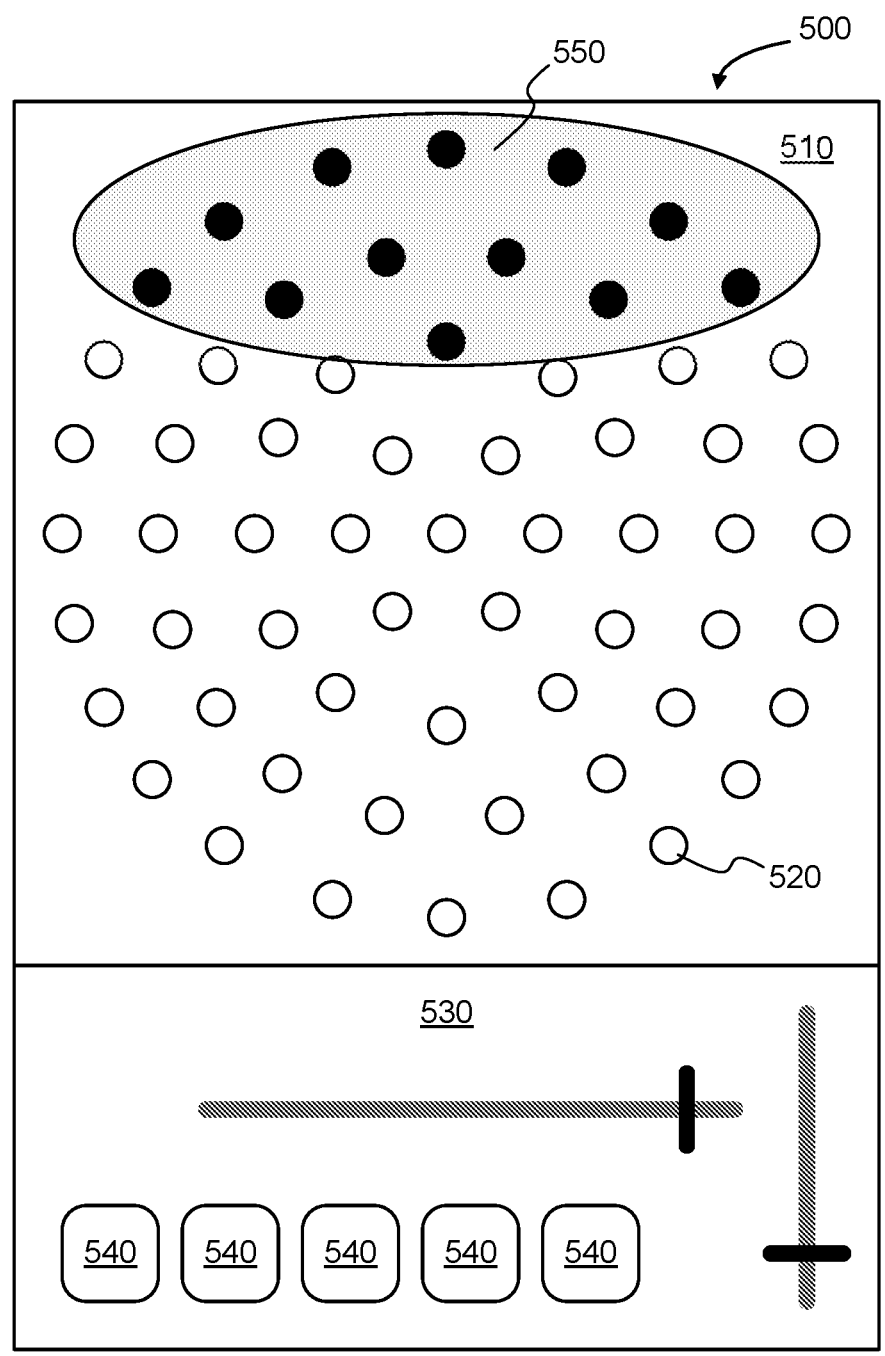
Figure 5C:
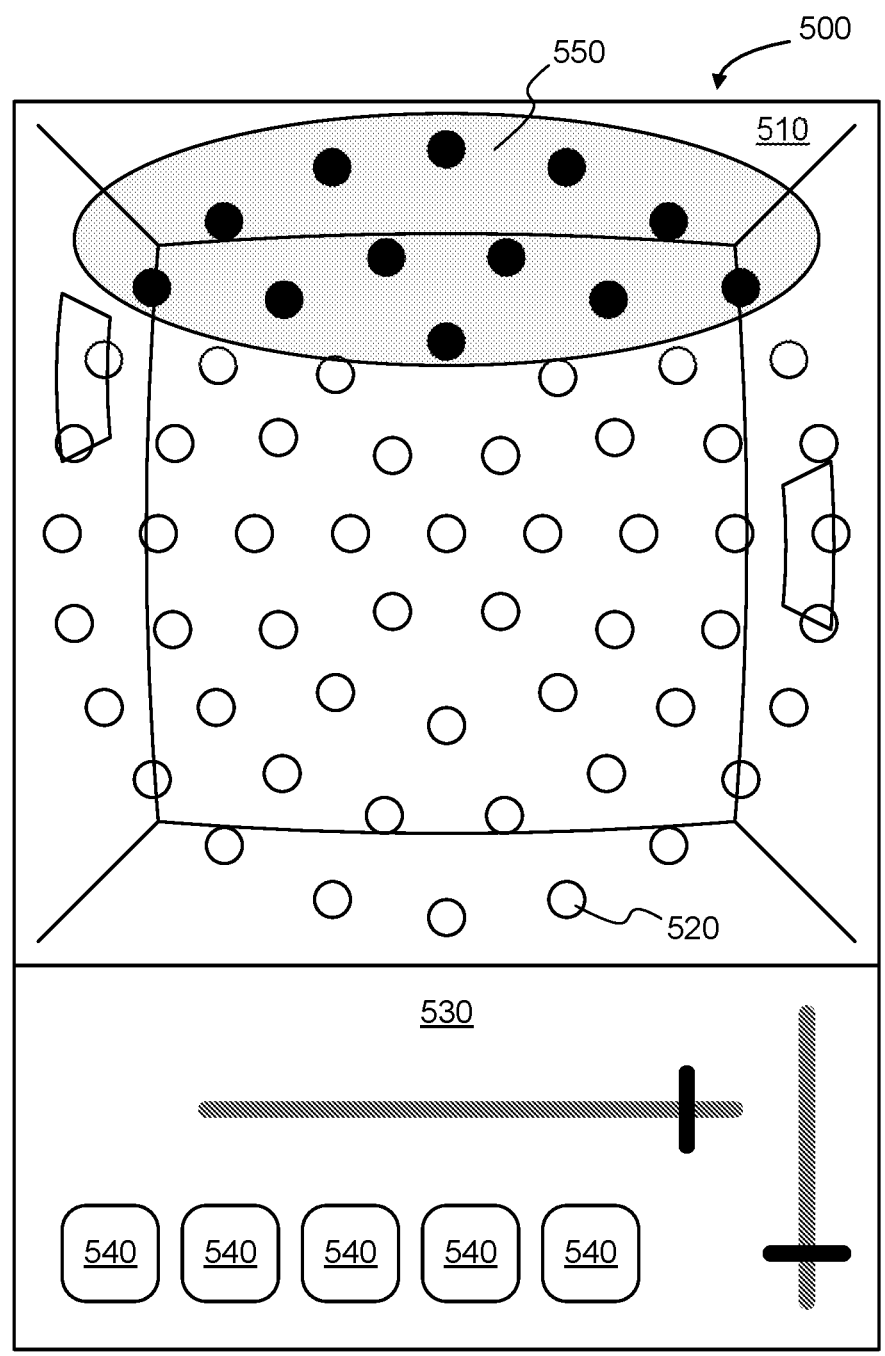

FIGS. 5A-5C show a user interface 500 of an example luminaire control program to control the programmable light distribution output from an example luminaire, such as the luminaire of FIG. 2. When a luminaire such as the luminaire 200 shown in FIGS. 2-4 is installed, the spatial distribution of light output by the luminaire 200 is controlled by interacting with a user interface 500 of a luminaire control application. In some embodiments, the luminaire control application may run on a mobile computer such as a laptop computer, tablet computer or smartphone. In other embodiments the luminaire control application may be hosted on a server and accessed over a network such as the Internet.

User interfaces for a luminaire control application are not limited to the user interface shown in FIGS. 5A, 5B, and 5C. The luminaire control application user interface of FIGS. 5A-5C is merely one example of a user interface for a luminaire control application. In the example user interface 500 shown in FIGS. 5A-5C, the user interface 500 includes a beam representation region 510 containing points 520 representing each of the individually controllable solid-state light sources 210 in the luminaire 200. The layout of the points 520 correspond to the layout of individually controllable solid-state light sources 210 in the corresponding luminaire. In the example shown in FIGS. 5A-5C the beam representation region 510 shows sixty-one points via which the light intensity of sixty-one individual solid-state light sources 210 of a luminaire 200 may be adjusted. When the luminaire 200 to be controlled has a different number of individually controllable solid-state light sources 210, the beam representation region 510 would likewise include a corresponding different number of points 520.

The user interface 500, in a first mode as shown in FIG. 5A, allows the user to select an individual point 520 in the beam representation region 510, for example by tapping on the point 520 representing the selected solid-state light source 210. The user interface 500, in this mode, allows the user to use one or more controls 540 in control panel 530 to set the intensity and optionally color of the light emitted by the solid-state light source 210 represented by the selected point 520. In this mode, the user may set the intensity of each individual solid-state light source 210, for example, to set the intensity of the selected solid-state light sources to accent particular aspects of the environment. The control panel 530 may include slide bars (illustrated in FIGS. 5A-5C) or other forms of user inputs to change the intensity, color, and other attributes of the selected solid-state light sources.

In a second mode, for example as shown in FIG. 5B, the user interface 500 allows the user to select a group of adjacent points 520 in the beam representation region 510, for example by using a multi-finger gesture to draw a highlighted region 550 encompassing a number of points 520 representing a set of selected solid-state light sources. By pinching and expanding highlighted region 540 in the beam representation region 510, the user may decrease or increase the dimensions of the highlighted region to select fewer or a larger number of points 520. The user may then use controls 540 in the control panel 530 to set the intensity of the set of selected solid-state light source, for example to form a beam of light directed toward a particular region of the environment.

In a third mode, which may be used with either the first mode or the second mode, the luminaire includes a camera and a view of the camera is displayed within the beam representation region 510. An example of this mode is shown in FIG. 5C. Points 520 representing the solid-state light sources 210 of the luminaire 200 are superimposed over the camera view of the room, to make it easier for the user to correlate actions on the solid-state light sources 210 to lighting within the area captured by the camera.

Use of the user interface 500 thus allows the user to control individual solid-state light sources 210 or groups of solid-state light sources 210 in the luminaire 200 to create desired lighting effects. However, in the situation in which a known lighting design is desired, for example in an environment where a lighting designer has created a lighting design that is to be implemented within a room or in multiple rooms of a building, programming the solid-state light sources 210 of each luminaire 200 may take a considerable amount of time. Likewise re-programming the luminaires 200 for different external ambient lighting conditions may be difficult.

According to various implementations, a previously designed desired lighting condition may be generated and uploaded into a memory of a solid state luminaire. In some implementations the previously designed desired lighting conditions are designed using a lighting design program such as the program discussed in connection with FIG. 1. In other implementations, the previously designed desired lighting conditions are IES files defining an output of another light source. An output file from the lighting design program, such as a set of IES files from a set of luminaires selected to implement the desired lighting conditions is outputted and uploaded into the memory of the solid state luminaire. A processor on the luminaire 200 or the luminaire control application uses the uploaded target IES file to determine luminance levels for the solid-state light sources 210 of the luminaire 200 to control operation of the solid-state light sources 210 to achieve the desired light beam distribution.

In one implementation, a user generates an IES file either from a measured luminaire or from a simulation. The user uploads the file in tabulated form to a web-based interface, which stores the IES file/beam distribution in a unique or public library. The system may generate a graphical representation of the IES file. The user accesses the files through the tablet interface. The user assigns the file to a single or multiple luminaires 200 having electronically adjustable light beam distributions. The luminaire 200 having the electronically adjustable light beam distribution uses the information in the file to calculate the luminance levels for the solid-state light sources 210 under its control to achieve the luminance levels specified by the file/beam distribution automatically without requiring the user to individually program lights or sets of lights.

FIG. 6 is a flow chart showing an example method of programming a luminaire 200 having an electronically adjustable light beam distribution according to some implementations. In some implementations, the method may be performed by a luminaire control application (e.g., luminaire control application 900 in FIG. 9) or by a control system of luminaire 200 (e.g., control system 800 in FIG. 8).

As shown in FIG. 6, a file describing a desired light beam distribution (e.g., file 810 in FIG. 8) is obtained in block 600. In some implementations, the file 810 is an IES file. In some implementations the file 810 is a EULUMDAT file. In some implementations the file 810 is a surface plot describing a luminance level at spatial coordinates, for example on surfaces within a room in which the luminaire 200 is installed. The file 810 may describe a desired light beam distribution to be implemented by adjusting the intensity levels of the solid-state light sources 210 of the luminaire 200. In some implementations the file 810 is obtained from a lighting design program. In some implementations the file 810 is obtained from a database of possible light beam distributions. In some implementations the file 810 is an IES or EULUMDAT file describing the output light beam distribution of a luminaire with a fixed light beam.

It may not be feasible for the luminaire 200 to recreate the lighting distribution as described in the file 810. According to some implementations, a feasibility check is performed to determine if it is feasible to implement the beam distribution described by the file in block 610. In one implementation, the feasibility check is intensity independent. An intensity independent feasibility check is implemented by processing the data of the file 810 independent of the intensity of the data. In one implementation the intensity independent feasibility check is implemented by normalizing the data of the file 810 to the maximum intensity of the distribution, and only geometric aspects are taken into consideration in determining the feasibility of the distribution. The intensity of the solid state light sources 210 is then determined based on the maximum intensity of the solid state light sources 210, and the geometric aspects of the IES light beam profile are then used to modulate the intensity of the solid-state light sources 210.

In another implementation, an intensity dependent feasibility check is used to determine if it is feasible for the luminaire 200 to implement the beam distribution described by the file 810. In this implementation, a calibration file for the luminaire 200 with all solid-state light sources 210 at full power is obtained. In some implementations the calibration file is an IES or EULUMDAT file. A comparison is then made using this calibration file to determine whether the maximum intensity of the desired beam distribution profile described by file 810 is possible with the luminaire 200.

In some implementations, to determine if a distribution is feasible for the luminaire 200 to implement, a goodness-of-fit may be calculated. In one implementation, a luminaire 200 light beam configuration profile file is obtained (e.g., light beam configuration profile file 920 in FIG. 9). In some implementations, the light beam configuration profile file 920 for the luminaire 200 is determined once for the type of luminaire 200 by measuring the light generated by each solid-state light source 210 independently, for example using a goniometer. In some implementations a first of the solid-state light sources 210 of luminaire 200 is set at full intensity and all other solid-state light sources 210 of luminaire 200 are set at zero intensity. A goniometer is then used to measure the output light beam distribution produced by the luminaire with the first of the solid-state light sources 210 turned on, to create an IES file for the luminaire 200 with the first of the solid-state light sources turned on. This process is iterated by individually activating each of the other solid-state light sources 210 and using the goniometer to measure the output light beam distribution produced by the luminaire when that solid-state light source is activated.

Any possible distribution the luminaire 200 may produce may be calculated by summing the contributions of N individual solid-state light source 210s (IN) with a scaling factor. For example, the luminous intensity in candela of a given distribution ($I_{FINAL}$) is the sum of each individual contribution IN by the individual solid-state light sources 210. When the individual solid-state light sources 210 are not turned on at full intensity, the contribution of a given individual solid-state light source 210 will be multiplied by an intensity constant $C_N$. If a solid-state light source 210 is off, the intensity constant $C_N$ for that solid-state light source 210 will be zero. If the solid-state light source 210 is at full intensity the intensity constant $C_N$ for that solid-state light source 210 will be one. If the solid-state light source 210 is dimmed the constant $C_N$ for that solid-state light source will be between zero and one. Hence, the luminous intensity of the luminaire 200 having M individual solid-state light sources 210 may be calculated as:

$$I_{FINAL} = C_1 * I_1 + C_2 * I_2 + C_3 * I_3 + \ldots C_M * I_M \quad \text{Equation (1)}$$

The far-field candela distribution of any light may be represented as a surface with an intensity value at every theta and phi coordinate. IES files typically contain slices showing intensity data at many rotational values, which may thus be used to create a full surface. In one implementation, the luminaire 200 may emulate a user-supplied light distribution by finding a best fit surface to this data using contributions from each of the individual solid-state light sources 210, by adjusting the intensity constants $C_N$ for each of the solid-state light sources 210 to approximate the intensity distribution specified by the file 810 uploaded in block 600.

If the desired light beam distribution is not feasible (e.g., a determination of "No" at block 610), the system may alert the user that the distribution is not feasible due to geometrical or intensity limitations in block 620. Other actions may be taken as well, such as to suggest an alternate light beam distribution that approximates the desired light beam distribution in block 625 and request the user to confirm whether the luminaire 200 should be configured to implement the alternate light beam distribution. In one implementation, the system may determine an alternate light beam distribution that includes changes to the absolute intensity or geometry of the desired light beam distribution to obtain a comparable distribution or lighting level. In another implementation the system may compute a best approximation to the desired light beam distribution.

If the desired light beam distribution is feasible (e.g., a determination of "Yes" at block 610), the system may calculate luminance levels for each of the solid-state light sources 210. In one implementation, the system calculates luminance levels for the solid-state light sources 210 by first determining whether the distribution is rotationally symmetric or asymmetric in block 630. If the desired light beam distribution is symmetric, the system may calculate luminance levels for the solid-state light sources 210 by calculating intensity levels for solid-state light sources 210 in one arc and then rotating the intensity levels 360 degrees to obtain intensity levels for all arcs of the solid-state light sources 210 in the luminaire 200 in block 640. If the desired light beam distribution is asymmetric, the system processes the spatial variations to achieve the desired light beam distribution in block 650.

After calculating the luminance levels for each solid-state light source 210 in the luminaire 200, the system may apply the calculated luminance levels to the luminaire in block 660. For example, the luminaire control application may instruct the luminaire to set the luminance levels of the solid-state light sources on the luminaire according to the calculated luminance levels. The luminaire 200 may proportionally power the solid-state light sources 210 to match the received luminance levels in block 670. For example, a control system on the luminaire may receive the calculated luminance levels from the luminaire control application and apply the appropriate power to each of the solid-state light sources.

There may be a number of different approaches to control the luminance level of the individual solid-state light sources 210. In a first implementation, the individual solid-state light sources 210 are set based on the known maximum intensity of the luminaire 200 with all solid-state light sources 210 at maximum intensity. Since the maximum intensity at a given power is known, the luminance level in this implementation is controlled as a percentage of that intensity or as a Pulse Width Modulation (PWM) level, for example.

In another implementation, a surface plot of the illumination at the target is obtained from the file 810 describing the desired light beam distribution, and the system finds the optimal combination of solid-state light sources 210, and illumination intensities for the optimal combination of solid-state light sources 210 that enables the luminaire 200 to match the illuminance level of the surface plot.

In some instances, multiple luminaires 200 may be deployed in a given area. In this instance, the system may determine illuminance levels of solid-state light sources 210 of multiple luminaires 200 that cooperatively match the illuminance levels specified by the file obtained in block 610. In some implementations the system creates optimal distributions for a given file that are collectively implemented by the multiple luminaires 200.

Figure 7:
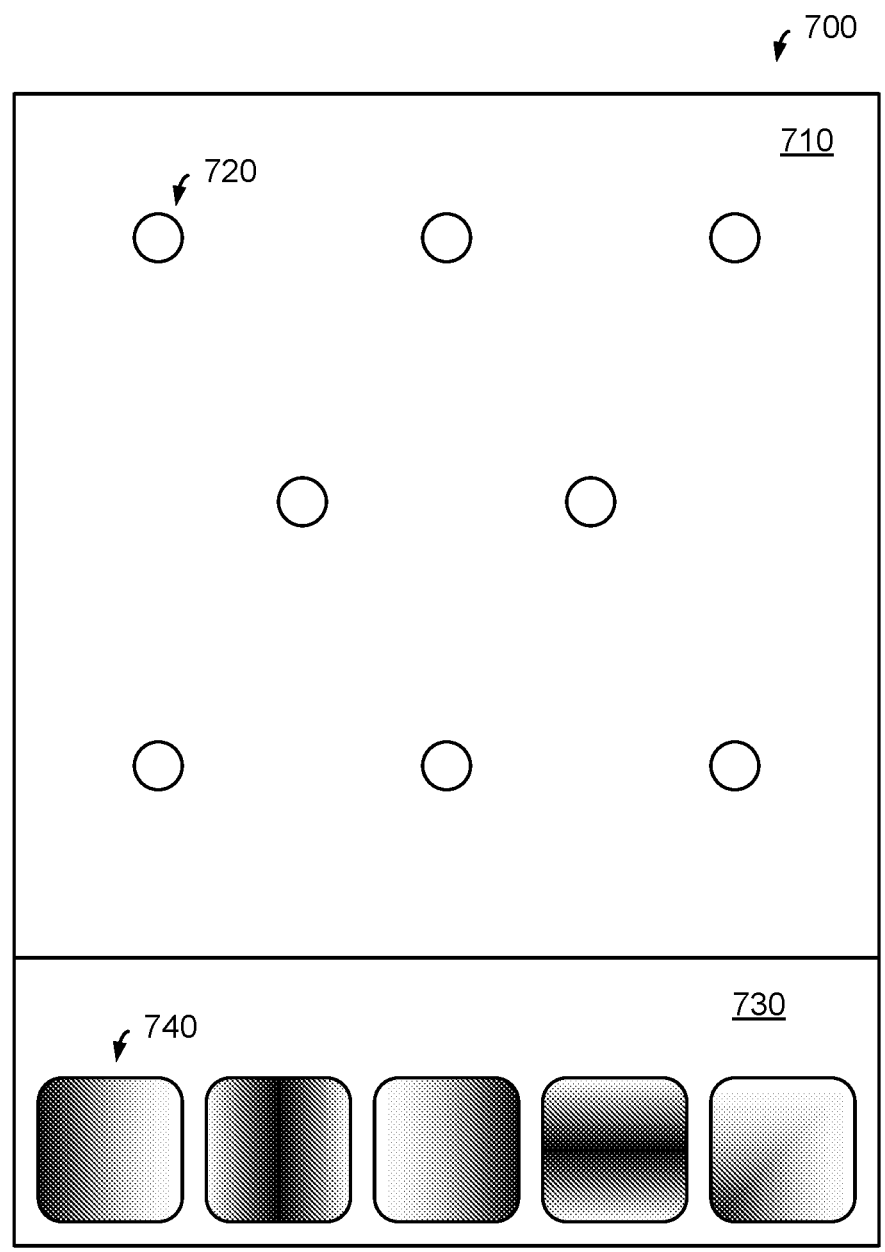
FIG. 7 is a screen view of an example user interface of a luminaire control program to control individual luminaires and sets of luminaires such as the luminaire of FIG. 2 according to some embodiments of the present disclosure.
Figure 9:
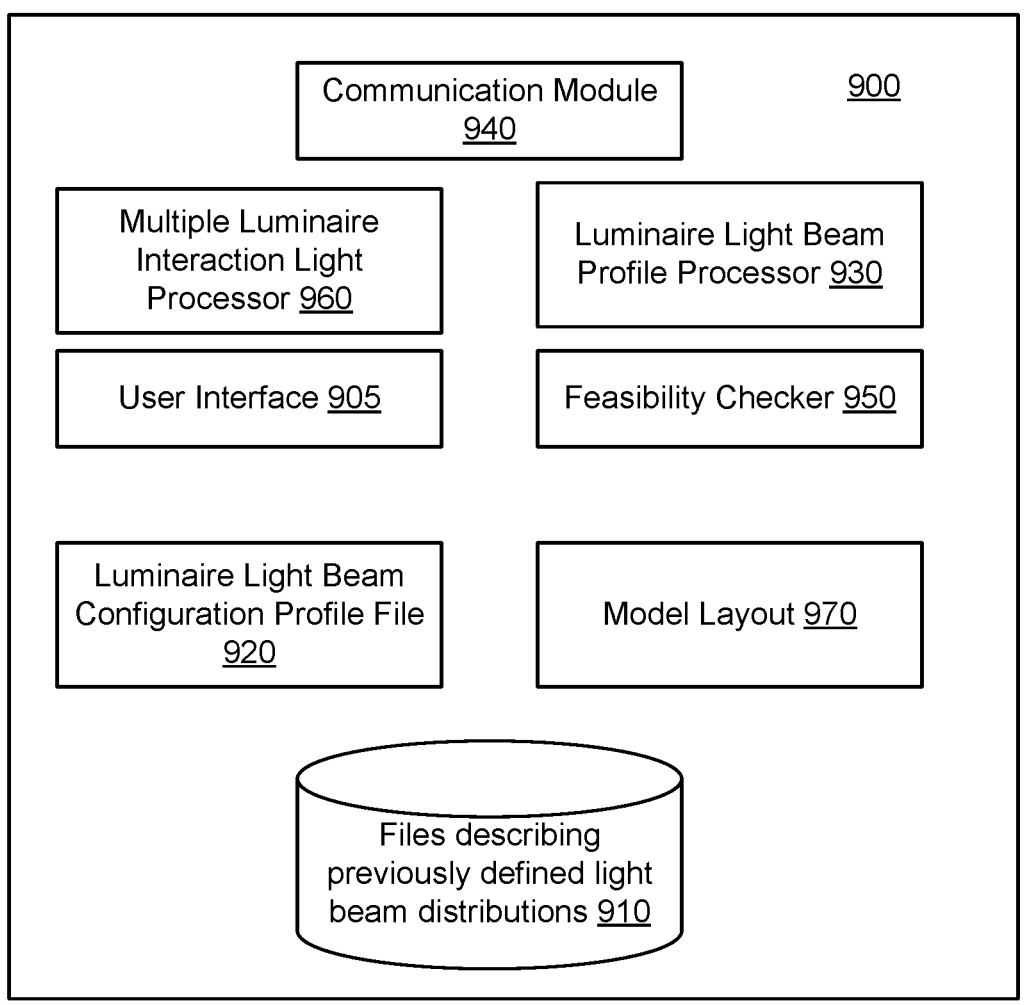
FIG. 9 is a block diagram of an example luminaire control application according to some embodiments of the present disclosure.

FIG. 7 shows a user interface 700 of an example luminaire control application running on a mobile computer such as a tablet computer or smartphone. An example functional block diagram of a luminaire control application is shown in FIG. 9. The user interface of FIG. 7, in one implementation, enables a user to control multiple luminaires 200 by associating desired beam profile files with the luminaires 200.

As shown in FIG. 7, the user interface 700 includes a room representation region 710. The room representation region optionally shows a two dimensional spatial map of the layout of the room in which the luminaires 200 are to be deployed, and contains luminaire icons 720 showing the approximate location of each luminaire 200 within the room.

A light distribution library menu 730 is provided on the user interface. The light distribution library menu 730 contains a library of light distribution profiles 740 that the user may select and assign to individual luminaires 720. In some implementations the library contains files 810 describing light beam distributions. In some implementations the library contains links to an external database containing files 810 describing light beam distributions. In some implementations, the user may assign a light distribution profile 740 to a particular luminaire 200 represented by a luminaire icon 720 on the room representation region 710 by dragging the light distribution profile 740 from the light distribution library menu 730 onto the selected luminaire icon 720. By selecting a desired light distribution profile 740 and dragging and dropping the light distribution profile 740 onto the luminaire icon 720, the luminaire control application will cause the solid-state light sources 210 of the luminaire 200 to be programmed to implement the desired light distribution profile.

Optionally, once the desired light distribution profile 740 is selected and applied to a luminaire icon 720, the desired light distribution profile 740 may be adjusted such as by rotating the desired light distribution profile 740. In one implementation, clicking on the desired light distribution profile 740 for a luminaire icon 720 will cause a user interface 500 such as described above in connection with FIGS. 5A-5C to be shown to enable the user to further interact with points 520 to control individual solid-state light sources 210 of the selected luminaire 200. In some implementations a single light distribution profile 740 may be applied to a given luminaire icon 720. In some implementations multiple light distribution profiles 740 may be applied to a given luminaire icon and summed by the luminaire to enable the luminaire to output light defined by the combination of the two or more selected light distribution profiles 740.

In one implementation, files 810 describing desired light beam distributions are implemented as IES files describing light output by conventional light sources. These files 810 may be stored in a publicly available or private database of IES files. In one implementation, the files 810, such as IES or EULUMDAT files, are stored on-line in a database accessible via the Internet. When a lighting model is created using a lighting design program, the settings of light sources selected to implement the lighting model may be stored as an IES or EULUMDAT file stored in the database.

The user interface of the luminaire control application accesses files 810 with photometric and light beam pattern distribution information and creates light distribution profiles specifying intensity levels for solid-state light sources 210 of luminaires 200. In some implementations, each light distribution profile 740 is associated with an icon in the light distribution library menu 730 of the user interface 700. A user may then drag and drop the light distribution profiles 740 onto particular luminaire icons 720 or otherwise associate the light distribution profiles 740 with luminaire icons 720 to program the luminaires 200 to cause the luminaires to implement the desired light distribution profiles 740.

In another implementation, when a user uses the user interface 500 to set the intensity levels for points 520 representing solid state light sources 210 of a luminaire 200, the intensity levels may be stored and an IES file of the luminaire's current state may be created and stored. As noted above, since the luminaire light beam configuration profile file 920 was created by detecting the light beam profile of each individual solid-state light source 210, the output IES file of a luminaire 200 may be calculated using the current individual intensity levels of the solid-state light sources 210 and the luminaire light beam configuration profile file 920 as: $I_{FINAL}=C_1*I_1+C_2*I_2+C_3*I_3+ \ldots C_M*I_M$. In this calculation, the I values are taken from the luminaire light beam configuration profile file 920 and the C values are based on the current scaling or dimming value applied to the respective solid-state light sources 210. An IES file defining the current state of the luminaire 200 may therefore be created, stored, and re-used via user interface 700 to allow the state of one luminaire 200 to be replicated on other luminaires 200.

In an implementation in which the luminaire 200 includes solid-state light sources 210 that are capable of producing multiple colors, an IES-like file that includes color information at every coordinate may be created. Alternatively, multiple IES files (one for each color) may be created and used to determine the optimal luminance levels for the solid-state light sources 210 as well as the color of the solid-state light sources 210.

In an implementation, if a user is not able to achieve a desired light distribution, the user interface of the luminaire control application may suggest additional luminaires or other types of lighting that may be added to the room to enable the target desired light distribution to be achieved.

Figure 8:
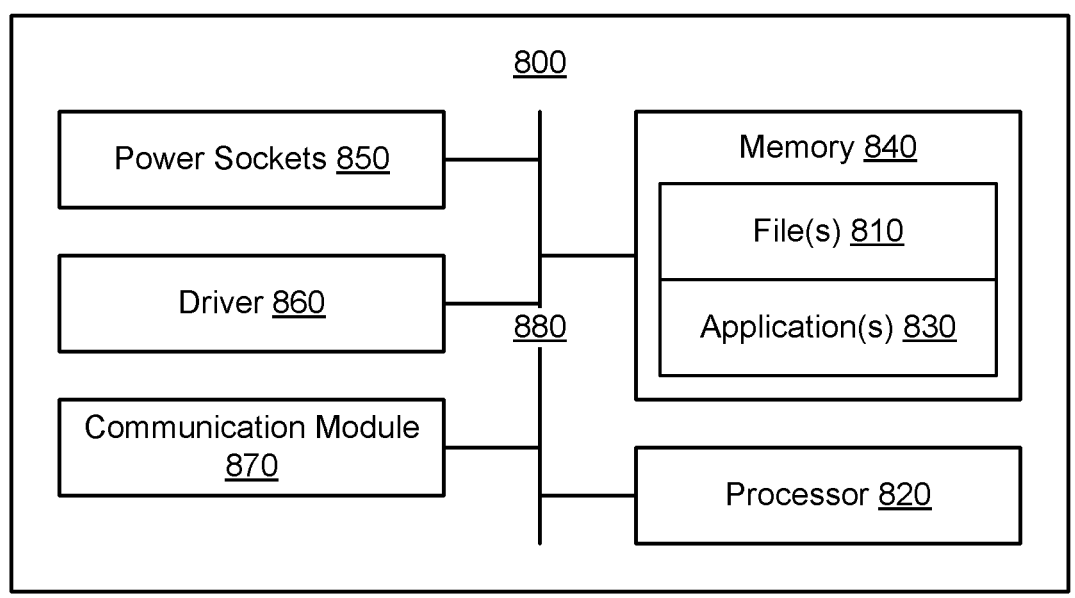
FIG. 8 is a block diagram of an example luminaire with programmable light distribution according to some embodiments of the present disclosure.

FIG. 8 shows an example control system 800 of luminaire 200. As shown in FIG. 8, the example control system 800 includes a processor 820 that accesses applications 830 stored in memory 840. Files 810 describing desired light beam distributions may also be stored in memory 840. The memory 840 may be any form of non-transitory tangible computer-readable storage medium. In operation, an application executing on the control system 800 processes the file 810 to determine power levels to be applied to solid-state light sources 210 associated with power sockets 850. Optionally driver 860 may be used to set power levels at power sockets 850. A communication module 870 enables control system 800 to communicate with a luminaire control application 900 such as the luminaire control application described in connection with FIG. 9. Components of control system 800 may be interconnected by bus 880. Control system 800 may include additional components as well, which have not been shown in FIG. 8 to avoid obfuscation of the various implementations.

FIG. 9 shows an example luminaire control application 900. The luminaire control application 900 may be located on a computing device that communicates with and controls one or more luminaires 200 (e.g., a smartphone, tablet, laptop, desktop, server). As shown in FIG. 9, the example luminaire control application 900 has a user interface 905 defining the luminaire control application user interface 500. The luminaire control application 900 includes a set of files, or has access to a set of files 910, describing previously defined light beam distributions. The luminaire control application also includes a luminaire light beam configuration profile file 920 containing IES data about the luminaire 200 with each individual solid-state light source individually turned on as described above.

The luminaire control application 900, in some implementations, also includes a luminaire light beam profile processor 930. The luminaire light beam profile processor 930 takes a selected file 810 describing a selected previously defined light beam distribution, i.e. IES data, and computes luminance levels to be applied to the solid-state light sources 210 of luminaire 200. In some implementations, the luminaire control application 900 outputs the computed luminance levels to the luminaire 200 via communication module 940. The communication 940 may enable wired or wireless communication between the luminaire control application 900 and one or more luminaires 200 and/or control systems 800 of luminaires 200. In other implementations the luminaire control application 900 outputs the file describing the desired light beam distribution 810 to the control system 800 of the luminaire 200, and the control system 800 of the luminaire 200 computes the luminance levels to be applied to the solid-state light sources 210.

In some implementations, the luminaire control application includes a feasibility checker 950 configured to perform the feasibility checks described above in connection with FIG. 6.

In some implementations, the luminaire control application includes a multiple luminaire light processor 960. In some implementations, the multiple luminaire light processor 960 uses a representation of a model layout 970 in which the multiple luminaires are installed, to determine overlap between light beams output by adjacent luminaires 200 to collectively adjust the amount of light applied at a surface of the model by luminaires 200.

The methods and systems described herein are not limited to a particular hardware or software configuration, and may find applicability in many computing or processing environments. The methods and systems may be implemented in hardware or software, or a combination of hardware and software. The methods and systems may be implemented in one or more computer programs, where a computer program may be understood to include one or more processor executable instructions. The computer program(s) may execute on one or more programmable processors, and may be stored on one or more non-transitory tangible computer-readable storage medium readable by the processor (including volatile and non-volatile memory and/or storage elements), one or more input devices, and/or one or more output devices. The processor thus may access one or more input devices to obtain input data, and may access one or more output devices to communicate output data. The input and/or output devices may include one or more of the following: Random Access Memory (RAM), Read Only Memory (ROM), cache, optical or magnetic disk, Redundant Array of Independent Disks (RAID), floppy drive, CD, DVD, internal hard drive, external hard drive, memory stick, or other storage device capable of being accessed by a processor as provided herein, where such aforementioned examples are not exhaustive, and are for illustration and not limitation.

The computer program(s) may be implemented using one or more high level procedural or object-oriented programming languages to communicate with a computer system; however, the program(s) may be implemented in assembly or machine language, if desired. The language may be compiled or interpreted.

As provided herein, the processor(s) may thus be embedded in one or more devices that may be operated independently or together in a networked environment, where the network may include, for example, a Local Area Network (LAN), wide area network (WAN), and/or may include an intranet and/or the Internet and/or another network. The network(s) may be wired or wireless or a combination thereof and may use one or more communications protocols to facilitate communications between the different processors. The processors may be configured for distributed processing and may utilize, in some embodiments, a client-server model as needed. Accordingly, the methods and systems may utilize multiple processors and/or processor devices, and the processor instructions may be divided amongst such single- or multiple-processor/devices.

The device(s) or computer systems that integrate with the processor(s) may include, for example, a personal computer(s), workstation(s), personal digital assistant(s) (PDA(s)), handheld device(s) such as cellular telephone(s) or smart cellphone(s), laptop(s), tablet or handheld computer(s), or another device(s) capable of being integrated with a processor(s) that may operate as provided herein. Accordingly, the devices provided herein are not exhaustive and are provided for illustration and not limitation.

References to "a microprocessor" and "a processor", or "the microprocessor" and "the processor," may be understood to include one or more microprocessors that may communicate in a stand-alone and/or a distributed environment(s), and may thus be configured to communicate via wired or wireless communications with other processors, where such one or more processor may be configured to operate on one or more processor-controlled devices that may be similar or different devices. Use of such "microprocessor" or "processor" terminology may thus also be understood to include a central processing unit, an arithmetic logic unit, an application-specific integrated circuit (IC), and/or a task engine, with such examples provided for illustration and not limitation.

Throughout the entirety of the present disclosure, use of the articles "a" and/or "an" and/or "the" to modify a noun may be understood to be used for convenience and to include one, or more than one, of the modified noun, unless otherwise specifically stated. The terms "comprising", "including" and "having" are intended to be inclusive and mean that there may be additional elements other than the listed elements.

Elements, components, modules, and/or parts thereof that are described and/or otherwise portrayed through the figures to communicate with, be associated with, and/or be based on, something else, may be understood to so communicate, be associated with, and or be based on in a direct and/or indirect manner, unless otherwise stipulated herein.

Implementations of the systems and methods described above comprise computer components and computer-implemented processes that will be apparent to those skilled in the art. Furthermore, it should be understood by one of skill in the art that the computer-executable instructions may be executed on a variety of processors such as, for example, microprocessors, digital signal processors, gate arrays, etc. In addition, the instructions may be implemented in a high-level procedural and/or object-oriented programming language, and/or in assembly/machine language. For ease of exposition, not every element of the systems and methods described above is described herein as part of a computer system, but those skilled in the art will recognize that each step or element may have a corresponding computer system or software component. Such computer system and/or software components are therefore enabled by describing their corresponding steps or elements (that is, their functionality), and are within the scope of the disclosure.

The following reference numerals are used in the drawings:

100 user interface of lighting design program
110 model display area
120 file repository area
130 tool ribbon
140 graphical model
200 luminaire
210 solid-state light source
220 housing
230 aperture
500 user interface of lighting control application
510 beam representation region
520 points
530 control panel
540 control
550 highlighted region
700 user interface of luminaire control application
710 room representation region
720 luminaire icon
730 light distribution library menu
740 light distribution profiles
800 control system of luminaire 200
810 file(s) describing desired light beam distribution
820 processor
830 applications
840 memory
850 power sockets
860 driver
870 communication module
880 bus
900 luminaire control application
905 user interface
910 files describing previously defined light beam distributions
920 luminaire light beam configuration profile file
930 luminaire light beam profile processor
940 communication module
950 feasibility checker
960 multiple luminaire interaction light processor
970 model layout Although the methods and systems have been described relative to specific embodiments thereof, they are not so limited. Many modifications and variations may become apparent in light of the above teachings. Many additional changes in the details, materials, and arrangement of parts, herein described and illustrated, may be made by those skilled in the art. A number of implementations have been described. Nevertheless, it will be understood that additional modifications may be made without departing from the scope of the inventive concepts described herein, and, accordingly, other implementations are within the scope of the following claims.

What is claimed is:

1. A method of setting luminance levels of solid-state light sources of a luminaire with programmable light distribution, the method comprising:
   obtaining a file describing a desired light beam distribution from another luminaire with programmable light distribution, wherein the desired light beam distribution comprises measured light output levels of solid-state light sources in the other luminaire;
   converting the desired light beam distribution into luminance levels for the solid-state light sources; and
   applying the luminance levels to the solid-state light sources to cause the luminaire to output the desired light beam distribution.

2. The method of claim 1, wherein obtaining the file describing the desired light beam distribution comprises obtaining an IES file or a EULUMDAT file describing the desired light beam distribution.

3. The method of claim 2, wherein the IES file or the EULUMDAT file is obtained from a database of IES files or EULUMDAT files.

4. The method of claim 1, further comprising:
   obtaining an output of a lighting design program, wherein the output comprises the file; and
   identifying the luminaire from the output of the lighting design program.

5. The method of claim 1, further comprising:
   performing a feasibility check to determine if the desired light beam distribution is feasible to implement on the solid-state light sources of the luminaire.

6. The method of claim 5, wherein the feasibility check is intensity independent.

7. The method of claim 6, wherein performing the feasibility check comprises:
   normalizing data of the file describing the desired light beam distribution to a maximum intensity of the distribution, and using geometric aspects of the desired light beam distribution to determine if the desired light beam distribution is feasible to implement on the solid-state light sources of the luminaire.

8. The method of claim 7, wherein converting the desired light beam distribution into the luminance levels for the solid-state light sources comprises modulating an intensity of the solid-state light sources to emulate the geometric aspects of the desired light beam distribution.

9. The method of claim 5, wherein the feasibility check is intensity dependent.

10. The method of claim 9, wherein performing the feasibility check comprises:
    obtaining a calibration file for the luminaire with all solid-state light sources at full intensity and comparing the calibration file to a maximum intensity of the desired light beam distribution.

11. The method of claim 1, wherein converting the desired light beam distribution into the luminance levels for the solid-state light sources comprises:
    determining whether the desired light beam distribution is rotationally symmetric.

12. The method of claim 11, wherein in response to determining that the desired light beam distribution is rotationally symmetric, converting the desired light beam distribution into the luminance levels for the solid-state light sources comprises:
    calculating luminance levels for one arc of the solid-state light sources and applying the calculated luminance levels to other arcs of the solid-state light sources.

13. The method of claim 11, wherein in response to determining that the desired light beam distribution is not rotationally symmetric, converting the desired light beam distribution into the luminance levels for the solid-state light sources comprises:
    processing spatial variations to achieve the desired light beam distribution.

14. The method of claim 1, wherein converting the desired light beam distribution into the luminance levels for the solid-state light sources comprises:
    obtaining a light beam configuration profile file specifying individual contributions of the solid-state light sources; and
    determining intensity constants to be applied to the solid-state light sources from the light beam configuration profile file.

15. The method of claim 1, wherein the file comprises a surface plot of luminance levels at a target surface.

16. A non-transitory tangible computer readable storage medium having stored thereon a computer program for implementing a method of setting luminance levels of solid-state light sources of a luminaire with programmable light distribution, the computer program comprising instructions which, when executed by a computer, cause the computer to perform a process comprising:
    obtaining a file describing a desired light beam distribution from another luminaire with programmable light distribution, wherein the desired light beam distribution comprises measured light output levels of solid-state light sources in the other luminaire;
    converting the desired light beam distribution into luminance levels for the solid-state light sources; and
    applying the luminance levels to the solid-state light sources to cause the luminaire to output the desired light beam distribution.

17. The non-transitory tangible computer readable storage medium of claim 16, further comprising instructions which, when executed by the computer, cause the computer to perform the process further comprising:
    implementing a user interface through which a user of the computer interacts with the computer program, the user interface enabling the user to select the file describing the desired light beam distribution from a set of files describing previously defined light beam distributions.

18. A lighting system, comprising:
    one or more luminaires, wherein a first luminaire in the one or more luminaries comprises a plurality of solid-state light sources; and
    a computer communicatively coupled to the one or more luminaires, the computer comprising a processor that is configured to:
       obtain a file describing a desired light beam distribution from another luminaire with programmable light distribution, wherein the desired light beam distribution comprises measured light output levels of solid-state light sources in the other luminaire;
       convert the desired light beam distribution into luminance levels for the plurality of solid-state light sources of the first luminaire; and
       apply the luminance levels to the plurality of solid-state light sources to cause the first luminaire to output the desired light beam distribution.

19. The lighting system of claim 18, wherein the processor is further configured to:
  receive a user input to change the luminance levels for one or more of the plurality of solid state light sources of the first luminaire; and
  apply the changed luminance levels to the one or more solid-state light sources of the first luminaire.

* * * * *